United States Patent
Sun et al.

(10) Patent No.: US 11,860,494 B2
(45) Date of Patent: Jan. 2, 2024

(54) LIQUID CRYSTAL DISPLAY PANEL AND LIQUID CRYSTAL DISPLAY DEVICE

(71) Applicant: BOE Technology Group Co., Ltd., Beijing (CN)

(72) Inventors: Xuefei Sun, Beijing (CN); Xue Dong, Beijing (CN); Shunhang Zhang, Beijing (CN); Xinxing Wang, Beijing (CN); Hua Huang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 111 days.

(21) Appl. No.: 17/754,318

(22) PCT Filed: May 12, 2021

(86) PCT No.: PCT/CN2021/093297
§ 371 (c)(1),
(2) Date: Mar. 30, 2022

(87) PCT Pub. No.: WO2022/001386
PCT Pub. Date: Jan. 6, 2022

(65) Prior Publication Data
US 2022/0397800 A1    Dec. 15, 2022

(30) Foreign Application Priority Data
Jun. 30, 2020    (CN) .......................... 202010612269.0

(51) Int. Cl.
*G02F 1/1362*    (2006.01)
*G02F 1/1368*    (2006.01)
(52) U.S. Cl.
CPC ...... *G02F 1/136286* (2013.01); *G02F 1/1368* (2013.01)

(58) Field of Classification Search
CPC .................................................. G02F 1/136286
See application file for complete search history.

(56) References Cited

U.S. PATENT DOCUMENTS

| 2005/0206814 A1 | 9/2005 | Histake |
| 2014/0098308 A1 | 4/2014 | Wu et al. |

(Continued)

FOREIGN PATENT DOCUMENTS

| CN | 103268044 A | 8/2013 |
| CN | 103926715 A | 7/2014 |

(Continued)

OTHER PUBLICATIONS

Chinese Office Action, dated Apr. 20, 2022, from Chinese Patent Application No. 202010612269.0.

(Continued)

*Primary Examiner* — Edmond C Lau
(74) *Attorney, Agent, or Firm* — Workman Nydegger

(57) ABSTRACT

Disclosed are a liquid crystal display panel and a liquid crystal display device. The liquid crystal display panel includes: a liquid crystal display structure, the liquid crystal display structure including: a plurality of first gate lines extending in a row direction, a plurality of first data lines extending in a column direction, and a plurality of sub-pixel units defined by the plurality of first gate lines and the plurality of first data lines; and a liquid crystal light control structure located on a light incident side of the liquid crystal display structure, the liquid crystal light control structure including: a plurality of second data lines, an orthographic projection of at least one second data line on the liquid crystal display structure overlapping the plurality of sub-pixel units.

20 Claims, 15 Drawing Sheets

(56) References Cited

U.S. PATENT DOCUMENTS

| | | | |
|---|---|---|---|
| 2015/0138473 A1 | 5/2015 | Zhang | |
| 2016/0370920 A1 | 12/2016 | Fan et al. | |
| 2019/0324335 A1* | 10/2019 | Bae | G02F 1/133753 |
| 2019/0355532 A1 | 11/2019 | Suzuki | |
| 2020/0124913 A1* | 4/2020 | Masuda | G09F 9/46 |
| 2020/0292894 A1 | 9/2020 | Liu et al. | |
| 2021/0055614 A1 | 2/2021 | Yang et al. | |

FOREIGN PATENT DOCUMENTS

| | | | |
|---|---|---|---|
| CN | 104536634 A | 4/2015 | |
| CN | 108983463 A | 12/2018 | |
| CN | 109581728 A | 4/2019 | |
| CN | 110133913 A | 8/2019 | |
| CN | 110297367 A | 10/2019 | |
| CN | 210166604 U | 3/2020 | |
| CN | 210376949 U | 4/2020 | |
| EP | 3032387 A1 | 6/2016 | |
| JP | 2019008541 A | 1/2019 | |

OTHER PUBLICATIONS

Chinese Decision of Rejection, dated Sep. 28, 2022, from Chinese Patent Application No. 202010612269.0.

\* cited by examiner

LIQUID CRYSTAL DISPLAY PANEL AND LIQUID CRYSTAL DISPLAY DEVICE

CROSS REFERENCE TO RELATED APPLICATIONS

The present disclosure is a U.S. National Stage of International Application No. PCT/CN2021/093297, filed on May 12, 2021, which claims the priority of the Chinese Patent Application No. 202010612269.0, filed with the Chinese Patent Office on Jun. 30, 2020, and entitled "LIQUID CRYSTAL DISPLAY PANEL AND LIQUID CRYSTAL DISPLAY DEVICE", part or the entire contents of which are incorporated herein by reference.

FIELD

The present disclosure relates to the field of displays, in particular to a liquid crystal display panel and a liquid crystal display device.

BACKGROUND

A liquid crystal display (LCD) panel is an important flat panel display device, which has been widely used in the fields of mobile phones, vehicles, monitors, televisions, and public displays. With the widespread use and increasing size of liquid crystal display panels, more and more people use the liquid crystal display panels to watch movies and play games, and thus pay more and more attention to display quality.

SUMMARY

In a first aspect, an embodiment of the present disclosure provides a liquid crystal display panel, including: a liquid crystal display structure, including: a plurality of first gate lines extending in a row direction, a plurality of first data lines extending in a column direction, and a plurality of sub-pixel units defined by the plurality of first gate lines and the plurality of first data lines; and a liquid crystal light control structure, located on a light incident side of the liquid crystal display structure, the liquid crystal light control structure including: a plurality of second data lines, and an orthographic projection of at least one second data line on the liquid crystal display structure overlapping the plurality of sub-pixel units.

Optionally, in the above liquid crystal display panel provided by the embodiment of the present disclosure, overlapping areas of orthographic projections of the plurality of second data lines on the liquid crystal display structure and each of the plurality of sub-pixel unit are the same.

Optionally, in the above liquid crystal display panel provided by the embodiment of the present disclosure, the liquid crystal light control structure further includes: a plurality of second gate lines intersecting the plurality of second data lines; the second gate lines are straight lines extending in the row direction; and the second data lines are broken lines, and a general direction of the broken lines is the column direction.

Optionally, in the above liquid crystal display panel provided by the embodiment of the present disclosure, the second data lines include: a plurality of broken line segments arranged periodically in the column direction; and a length of the broken line segments in the row direction is equal to or approximately equal to a width of m sub-pixel units, and a width of the broken line segments in the column direction is equal to or approximately equal to a length of n sub-pixel units, wherein m and n are greater than 0, and at least one of m or n is an integer.

Optionally, in the above liquid crystal display panel provided by the embodiment of the present disclosure, n is an integer, and each second data line further includes: a straight line segment connecting two adjacent broken line segments.

Optionally, in the above liquid crystal display panel provided by the embodiment of the present disclosure, a length of the straight line segment is larger than a width of a second gate line and smaller than a row gap of pixel rows formed by the plurality of sub-pixel units.

Optionally, in the above liquid crystal display panel provided by the embodiment of the present disclosure, the liquid crystal light control structure further includes: a plurality of switch transistors, where orthographic projections of the plurality of switch transistors on the liquid crystal display structure are located in the row gap; wherein, part of the second gate lines are gates of the switch transistors, and part of the straight line segments are one of sources or drains of the switch transistors.

Optionally, in the above liquid crystal display panel provided by the embodiment of the present disclosure, m is 6, and n is 3 or 4.

Optionally, in the above liquid crystal display panel provided by the embodiment of the present disclosure, m is an integer, n is a non-integer, and the broken line segments are arranged continuously and periodically in the column direction.

Optionally, in the above liquid crystal display panel provided by the embodiment of the present disclosure, m is 6 and n is 1.5.

Optionally, in the above liquid crystal display panel provided by the embodiment of the present disclosure, the broken line segments include: first line segments and second line segments of which extending directions intersect each other.

Optionally, in the above liquid crystal display panel provided by the embodiment of the present disclosure, first line segments and second line segments are symmetrical with respect to the row direction, or widths of first line segments and widths of second line segments in the column direction are unequal, and lengths of the first line segments and lengths of the second line segments in the row column are equal or approximately equal.

Optionally, in the above liquid crystal display panel provided by the embodiment of the present disclosure, the two adjacent broken line segments in the column direction are symmetrical with respect to the row direction.

Optionally, in the above liquid crystal display panel provided by the embodiment of the present disclosure, the liquid crystal display panel includes a display region and a peripheral region, and the liquid crystal light control structure further includes: a first light control unit located in the display region and a second light control unit located in the peripheral region; in a direction perpendicular to the liquid crystal display structure, a quantity of sub-pixel units covered by the second light control unit is smaller than a quantity of sub-pixel units covered by the first light control unit.

Optionally, in the above liquid crystal display panel provided by the embodiment of the present disclosure, the first light control unit and the second light control unit are each internally provided with a pixel electrode, and the liquid crystal light control structure further includes: a plurality of floating electrodes disposed in the same layer as the pixel electrodes; and the plurality of floating electrodes are located on a side of a plurality of second light control units away from the display region, and boundaries of the plurality of floating electrodes away from the display region extend in the same straight line.

Optionally, in the above liquid crystal display panel provided by the embodiment of the present disclosure, the liquid crystal light control structure further includes: a common electrode located between a layer where the switch transistors are located and a layer where the pixel electrodes are located; and an orthographic projection of the common electrode on a plane where the liquid crystal light control structure is located completely covers orthographic projections of the second data lines.

Optionally, in the above liquid crystal display panel provided by the embodiment of the present disclosure, inflection points of any two adjacent second data lines are flush with each other or staggered from each other in the row direction.

Optionally, in the above liquid crystal display panel provided by the embodiment of the present disclosure, orthographic projections of the inflection points of the plurality of second data lines on the liquid crystal display structure are located within orthographic projections of the plurality of first data lines.

Optionally, in the above liquid crystal display panel provided by the embodiment of the present disclosure, orthographic projections of the plurality of second gate lines on the liquid crystal display structure are located within orthographic projections of the plurality of first gate lines or overlap pixel rows formed by the plurality of sub-pixel units.

Optionally, in the above liquid crystal display panel provided by the embodiment of the present disclosure, the liquid crystal light control structure further includes: a plurality of second gate lines intersecting the plurality of second data lines; each of the second data lines is a straight line extending in a first direction intersecting both the row direction and the column direction; each of the second gate lines is a straight line extending in a second direction intersecting both the row direction and the column direction; and the plurality of second data lines and the plurality of second gate lines intersect each other to form a plurality of meshes.

Optionally, in the above liquid crystal display panel provided by the embodiment of the present disclosure, a projection length of the meshes in the row direction is approximately equal to a length of six sub-pixel units; and in the column direction, an included angle between the second data lines and the second gate lines ranges from 75° to 135°.

Optionally, in the above liquid crystal display panel provided by the embodiment of the present disclosure, a line width of the second data lines ranges from 0.5 μm to 3 μm.

Optionally, in the above liquid crystal display panel provided by the embodiment of the present disclosure, the second data lines are transparent traces.

Optionally, in the above liquid crystal display panel provided by the embodiment of the present disclosure, a light transmittance of the second data lines ranges from 0.8 to 0.98.

Optionally, in the above liquid crystal display panel provided by the embodiment of the present disclosure, a line width of the second data lines ranges from 0.5 μm to 12 μm.

On the other hand, an embodiment of the present disclosure provides a liquid crystal display device, including the above liquid crystal display panel and a backlight source.

DETAILED DESCRIPTION OF THE EMBODIMENTS

Figure 1:
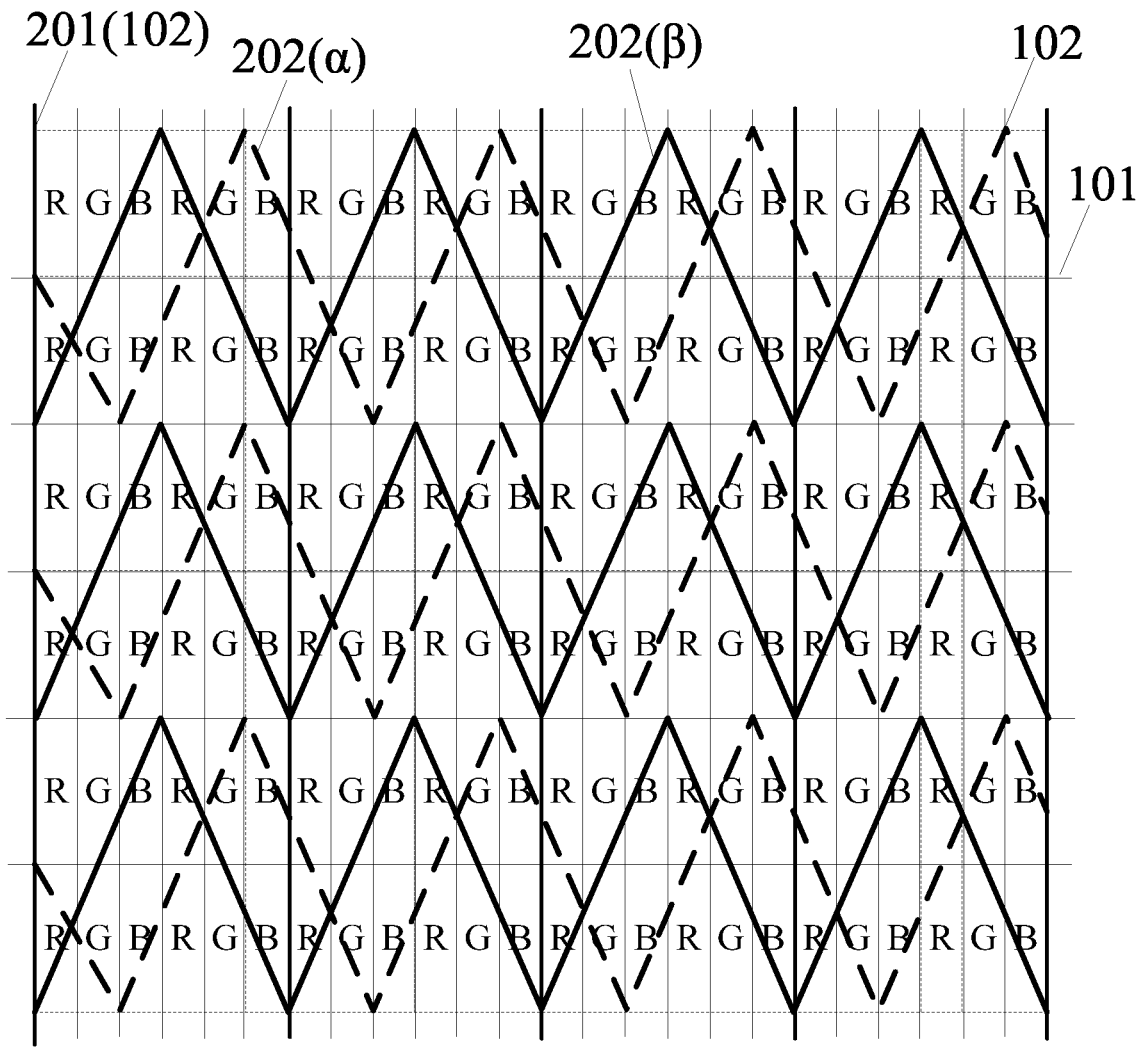
FIG. 1 is a principle schematic diagram of a color mura in the related art.

In order to enable objectives, technical solutions, and advantages of embodiments of the present disclosure to be clearer, the technical solutions of the embodiments of the present disclosure will be described in further detail below with reference to the accompanying drawings of the embodiments of the present disclosure. It should be noted that the dimensions and shapes of various figures in the accompanying drawings are not to truly scale and are intended to be merely illustrative of the content of the present disclosure. The same or similar reference numerals refer to the same or similar components or components having the same or similar functions throughout. Apparently, the described embodiments are merely some, but not all embodiments of this disclosure. Based on the described embodiments in the present disclosure, all other embodiments obtained by those ordinarily skilled in the art without involving any inventive effort are within the protection scope of the present disclosure.

Unless defined otherwise, technical or scientific terms used here shall have the ordinary meaning as understood by those ordinarily skilled in the art to which the present disclosure belongs. The terms "first", "second", and similar referents used in the specification and the claims of the present disclosure do not denote any order, quantity, or importance, but rather are used solely to distinguish one from another. The word "include" or "comprise", and the like, means that an element or article that precedes the word is inclusive of the element or article listed after the word and equivalents thereof, but does not exclude other elements or articles. The terms "inner", "outer", "upper", "lower", and the like are used merely to denote a relative positional relationship that may change accordingly when the absolute position of an object being described changes.

In the related art, a liquid crystal display panel includes a liquid crystal display structure and a backlight unit. By combining a local dimming (LD) technology to control the backlight unit, the display quality of the liquid crystal display panel can be improved. Generally, the local dimming technology refers to that an entire backlight unit is divided into a plurality of individually drivable backlight blocks, and each backlight block includes one or more LEDs. According to gray levels to be displayed in different parts of a display picture, the driving current of the LEDs of backlight partitions corresponding to these parts is automatically adjusted, so as to realize the independent adjustment of the brightness of each partition in the backlight unit, thereby improving the contrast of the display picture.

However, the local dimming technology is applicable to a direct type backlight unit, and the LEDs as the light source are, for example, uniformly distributed on an entire backplane. In order to use the local dimming technology in, for example, an edge type backlight unit, a liquid crystal light control structure needs to be added between the liquid crystal display panel and the edge type backlight unit, and the liquid crystal light control structure may control the light transmittance in a predetermined region. In the part with high screen brightness (gray level) of a liquid crystal display structure, the light transmittance of the corresponding region of the liquid crystal light control structure is also high, allowing more light from the backlight unit to pass through. In the part with low screen brightness of the liquid crystal display structure, the light transmittance of the corresponding region of the liquid crystal light control structure is also low, allowing less light from the backlight unit to pass through, so that the purpose of improving the contrast of the display picture and enhancing the display picture quality is achieved. In addition, when the direct type backlight unit is directly formed on a direct type backlight source, it is difficult to achieve high density (the quantity of backlight units per unit area) and precision for the division of the backlight unit. When the requirements for the division density and precision of light control units in the liquid crystal light control structure are high, the liquid crystal light control structure may be used to achieve this requirement, and a manufacturing process of the liquid crystal light control structure is easy to realize.

Specifically, the liquid crystal display panel including the liquid crystal display structure and the liquid crystal light control structure is a double-cell structure, and the liquid crystal display structure includes first grid patterns formed by first gate lines and first data lines that are intersected. The liquid crystal light control structure includes second grid patterns formed by second gate lines and second data lines that are intersected. However, the first grid patterns and the second grid patterns disposed in an overlay mode are similar, and moiré patterns are easy to produce, that is, the human eyes observe stripes of alternating light and dark. In order to avoid the bad moiré patterns, the grid pattern designs of the liquid crystal display structure and the liquid crystal light control structure are different. As shown in FIG. 1, first grate lines 101 and first data lines 102 of the liquid crystal display structure are straight lines, and second data lines 201 of the liquid crystal light control structure are straight lines, and second gate lines 202 of the liquid crystal light control structure are broken lines, so that the first grid patterns in the liquid crystal display structure and a second light control structure in the liquid crystal light control structure do not have the same or similar patterns, so that the human eyes can not feel the moiré patterns, so as to achieve the effect of eliminating or improving the moiré patterns.

In addition to a frontal viewing angle when a display product is actually used, the common viewing angle is left and right oblique viewing angles, and under different left and right oblique viewing angles, the second gate lines 202 in the shape of the broken lines in the liquid crystal light control structure have different shielding degrees for sub-pixel units with different colors. Specifically, the sub-pixel units located at the intersection of the second gate lines 202 in the liquid crystal light control structure and the first gate lines 101 in the liquid crystal display structure are less shielded by the second gate lines 202 in the shape of the broken lines. Therefore, an aperture ratio of the sub-pixel units is relatively large, and more colors of the sub-pixel units are displayed when the liquid crystal display panel displays. For example, under the oblique viewing angle α in FIG. 1, the second gate lines 202 in the shape of the broken lines shield green sub-pixel units G less, and more colors of the green sub-pixel units G are displayed when the liquid crystal display panel displays; and under the oblique viewing angle β, the second gate lines 202 in the shape of the broken lines shield red sub-pixel unit R less, and more colors of the red sub-pixel units R are displayed when the liquid crystal display panel displays. Based on this, the liquid crystal display panel will exhibit a color mura phenomenon.

It should be noted that FIG. 1 only exemplarily gives sub-pixel units of three colors of RGB, and during specific implementation, for example, white sub-pixel units W, yellow sub-pixel units Y or other colors of sub-pixel units may be included, which is not limited herein.

Aiming at the color mura phenomenon existing in the related art, an embodiment of the present disclosure provides a liquid crystal display panel, as shown in FIG. 2 to FIG. 14, including: a liquid crystal display structure (main cell) 01, including: a plurality of first gate lines 101 extending in a row direction X, a plurality of first data lines 102 extending in a column direction Y, and a plurality of sub-pixel units (for example, red sub-pixel units R, green sub-pixel units G and blue sub-pixel units B) defined by the plurality of first gate lines 101 and the plurality of first data lines 102; and a liquid crystal light control structure (sub cell) 02 located on a light incident side of the liquid crystal display structure 01, the liquid crystal light control structure 02 including: a plurality of second data lines 201, and an orthographic projection of at least one second data line 201 on the liquid crystal display structure 01 overlapping the plurality of sub-pixel units.

In the above liquid crystal display panel provided by the embodiment of the present disclosure, the orthographic projection of at least one second data line 201 in the liquid crystal light control structure 02 on the liquid crystal display structure 01 is set to overlap the plurality of sub-pixel units, so that the color mura may be seen in up and down oblique viewing angles, but cannot be felt or not obvious in common left and right oblique viewing angles, thereby improving the visual experience of a user.

Figure 2:
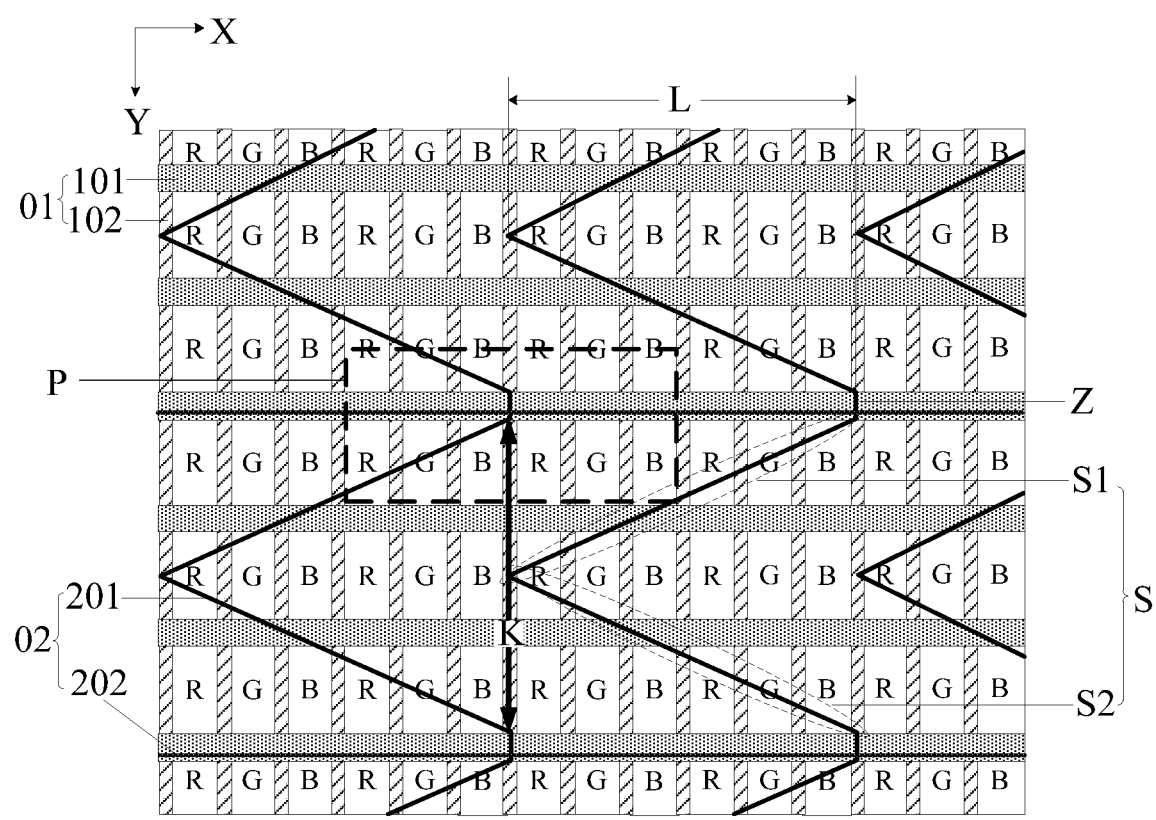
FIG. 2 is a schematic structural diagram of a liquid crystal display panel provided by an embodiment of the present disclosure.

In addition, as shown in FIG. 2, first grid patterns formed by the plurality of first data lines 102 and the plurality of first gate lines 101, and second grid patterns formed by the plurality of second data lines 201 and a plurality of second gate lines 202 vary widely in shape, to thereby improve or eliminate the moiré patterns.

Optionally, in the above liquid crystal display panel provided by the embodiment of the present disclosure, overlapping areas of the orthographic projections of the plurality of second data lines 201 on the liquid crystal display structure 01 and each sub-pixel unit are the same or approximately the same.

Since the plurality of second data lines 201 as a whole have substantially similar shielding conditions for the sub-pixel units of different colors, actual aperture ratios of the sub-pixel units of different colors are similar, thereby producing a mixed white light effect. Under the left and right oblique viewing angles, although the viewing angle misalignment still exists, the plurality of second data lines 201 before and after the misalignment seen by the human eyes uniformly shield each sub-pixel unit, and no obvious fluctuations in the color of the white light will be felt. Therefore, the color mura phenomenon is effectively improved.

It should be understood that, limited by factors such as a manufacturing process and equipment precision, in the present disclosure, the meaning of "approximately" is specifically within an allowable error range, for example, within a ±5% error range.

In addition, it should be noted that each sub-pixel unit includes a first thin film transistor (as a switch element), a first pixel electrode, and a first common electrode; a gate of the first thin film transistor is connected to a corresponding first gate line to receive a gate signal, a source of the first thin film transistor is connected to a corresponding first data line to receive a data signal, and a drain of the first thin film transistor is connected to the first pixel electrode to charge the first pixel electrode when in an on state; and the first common electrode and the first pixel electrode form a liquid crystal capacitor together with a first liquid crystal layer, after the first pixel electrode is charged, an electric field is formed between the first common electrode and the first pixel electrode to control rotation of liquid crystal molecules in the first liquid crystal layer. Depending on whether the liquid crystal display structure is a vertical electric field type or a horizontal electric field type, the first common electrode and the first pixel electrode may be located on the same substrate and adjacent to each other, or be located on different substrates and face each other. The liquid crystal display structure also includes a color film for color display.

Optionally, in the above liquid crystal display panel provided by the embodiment of the present disclosure, as shown in FIG. 2, the liquid crystal light control structure 02 further includes: the plurality of second gate lines 202 intersecting the plurality of second data lines 201; the second gate lines 202 are straight lines extending in the row direction X; and the second data lines 201 are broken lines, and a general direction of the broken lines is the column direction Y.

Since in addition to a frontal viewing angle when a display product is actually used, the common viewing angle is left and right oblique viewing angles, and positions of the second gate lines 202 extending in the row direction X viewed under different left and right oblique viewing angles are unchanged, the color mura phenomenon is mainly caused by the second data lines 201. By setting the second data lines 201 as the broken lines in the column direction Y of the general direction, the second data lines 201 viewed under different left and right oblique viewing angles may uniformly shield each sub-pixel unit. Therefore, the actual aperture ratio of each sub-pixel unit will be similar, the mixed white light effect is easy to achieve, and the color mura phenomenon is weakened. Optionally, in the above liquid crystal display panel provided by the embodiment of the present disclosure, in order to realize the uniform shielding effect of the second data lines 201 on the sub-pixel units of different colors, as shown in FIG. 2, the second data lines 201 may include: a plurality of broken line segments S arranged periodically in the column direction Y; and a length L of the broken line segments S in the row direction X is equal to or approximately equal to a width of m sub-pixel units, and a width K of the broken line segments S in the column direction is equal to or approximately equal to a length of n sub-pixel units, where m and n are greater than 0, and at least one of m or n is an integer.

Optionally, in the above liquid crystal display panel provided by the embodiment of the present disclosure, as shown in FIG. 2, n is an integer (for example, n is 3 or 4), specifically, in FIG. 2, m is 6, and n is 3; and each second data line 201 may further include: a straight line segment Z connecting two adjacent broken line segments S.

It should be noted that, since the width K of the broken line segments S in the column direction is equal to the length of the n sub-pixel units, and n is an integer, orthographic projections of two ends of the broken line segments S on the liquid crystal display structure 01 is located in row gaps of pixel rows formed by the sub-pixel units. Specifically, a length of the straight line segments Z may be greater than a width of the second gate lines 202 and smaller than the row gap of the pixel rows formed by the plurality of sub-pixel units, as shown in FIG. 2. During specific implementation, the length of the straight line segments Z may be 25 μm-40 μm, for example, 25 μm, 28 μm, 30 μm, 32 μm, 35 μm, 37 μm, and 40 μm.

Figure 3:
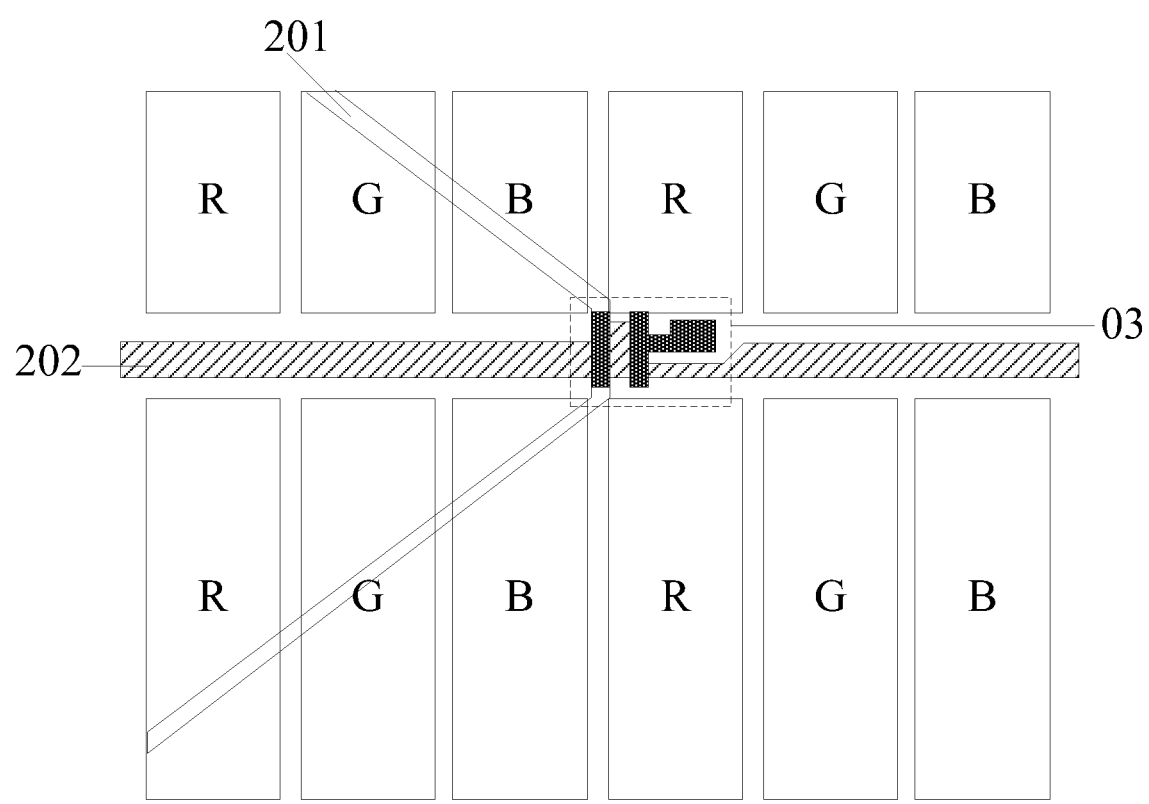
FIG. 3 is an enlarged schematic structural diagram of a P region in FIG. 2.
Figure 4:
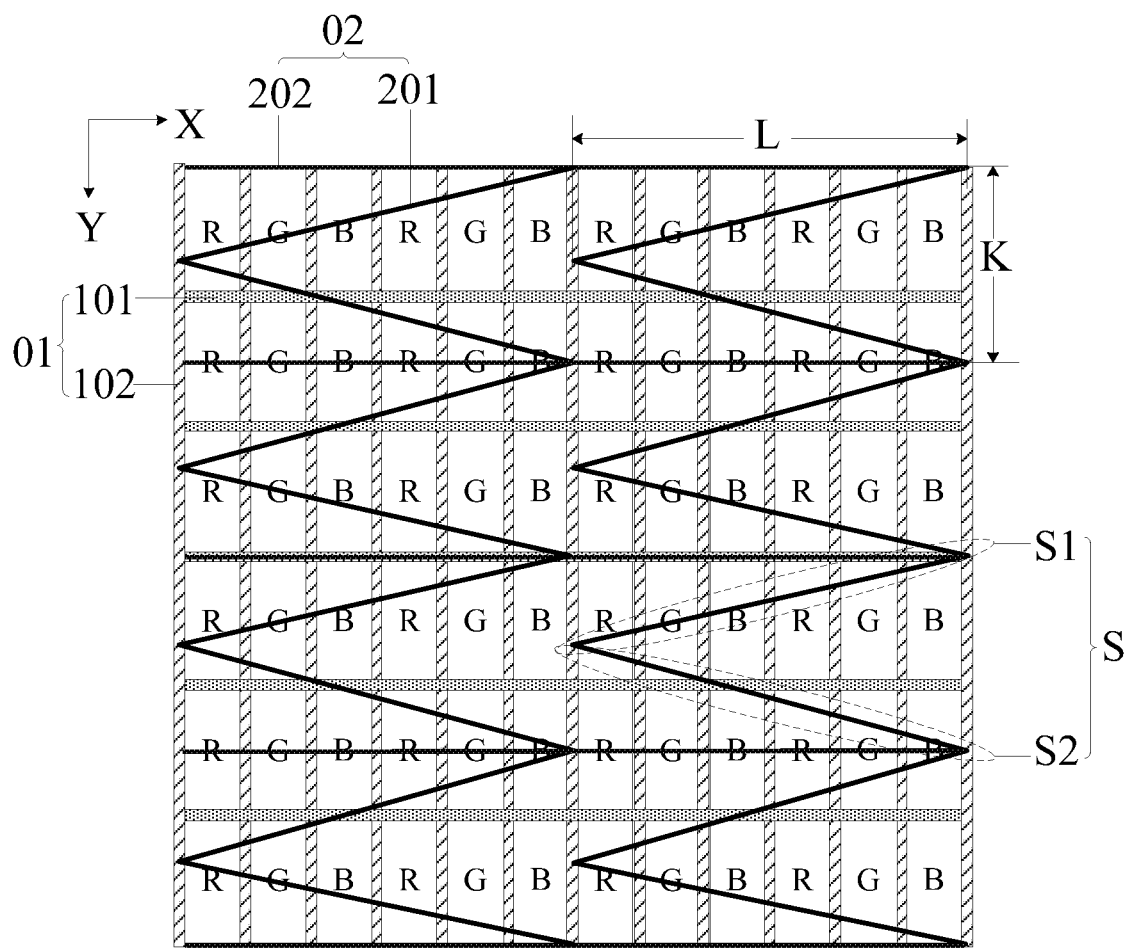
FIG. 4 is another schematic structural diagram of a liquid crystal display panel provided by an embodiment of the present disclosure.

Optionally, in the above liquid crystal display panel provided by the embodiment of the present disclosure, as shown in FIG. 3, the liquid crystal light control structure 02 further includes: a plurality of switch transistors 03, and orthographic projections of the plurality of switch transistors 03 on the liquid crystal display structure 01 are located in the row gap; and part of the second gate lines 201 are gates of the switch transistors 03, and part of the straight line segments Z are one of sources or drains of the switch transistors 03.

Figure 7:
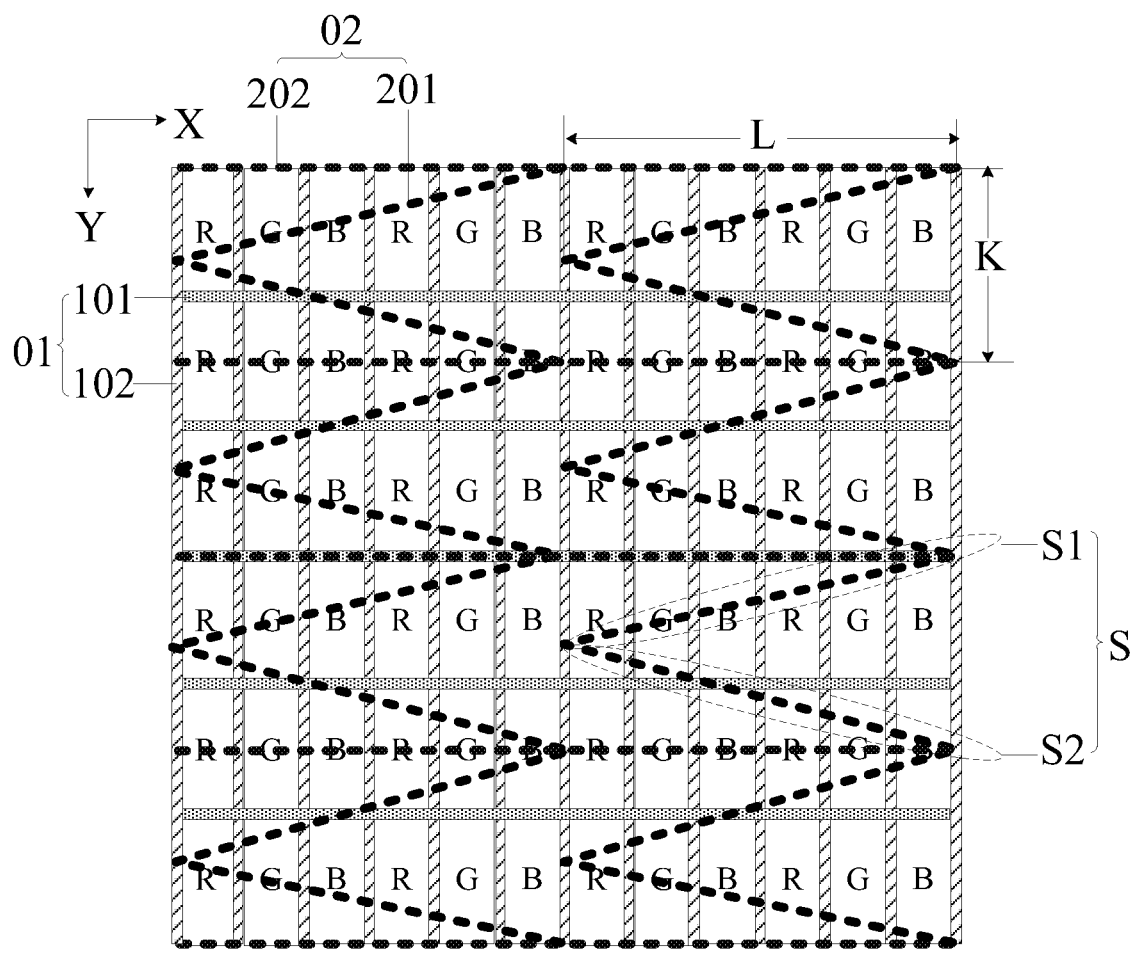
FIG. 7 is another schematic structural diagram of a liquid crystal display panel provided by an embodiment of the present disclosure.
Figure 8:
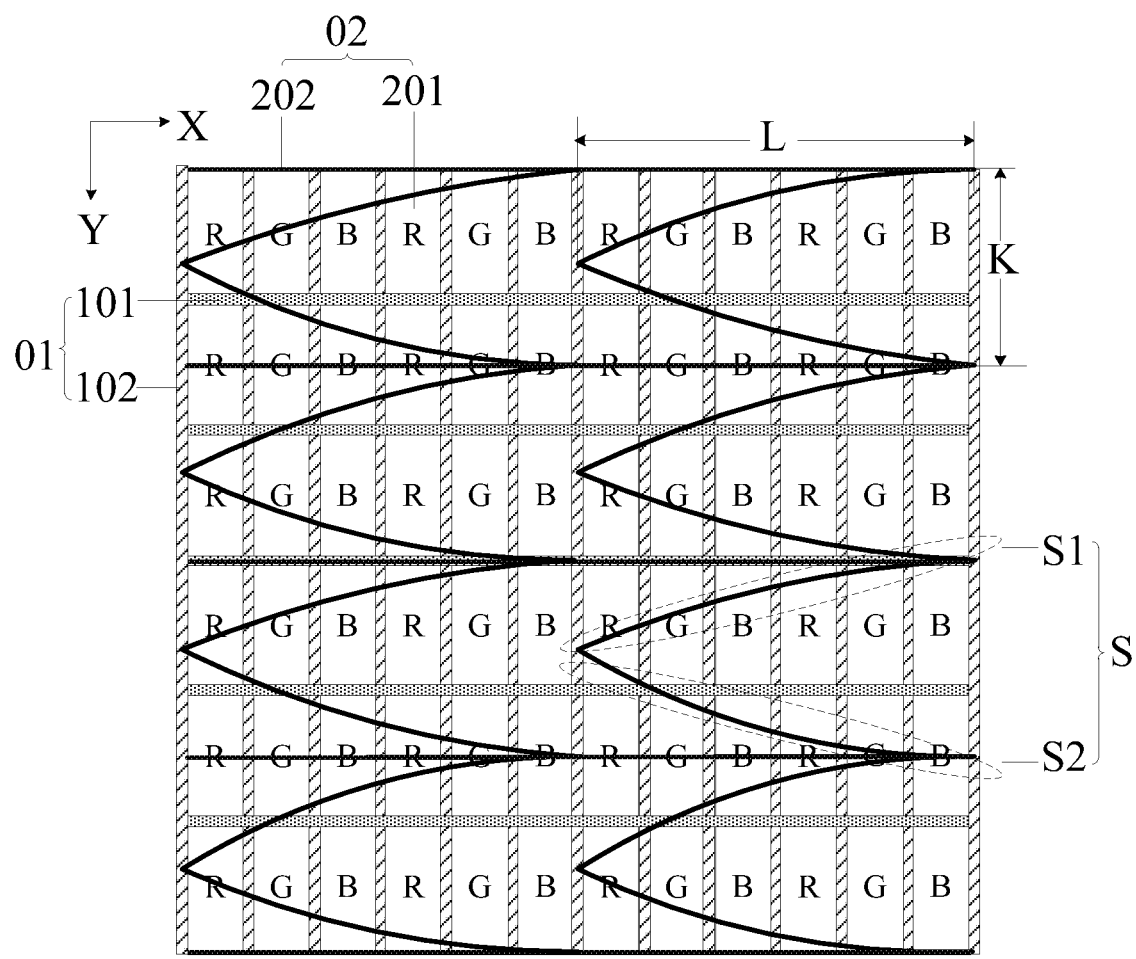
FIG. 8 is another schematic structural diagram of a liquid crystal display panel provided by an embodiment of the present disclosure.
Figure 9:
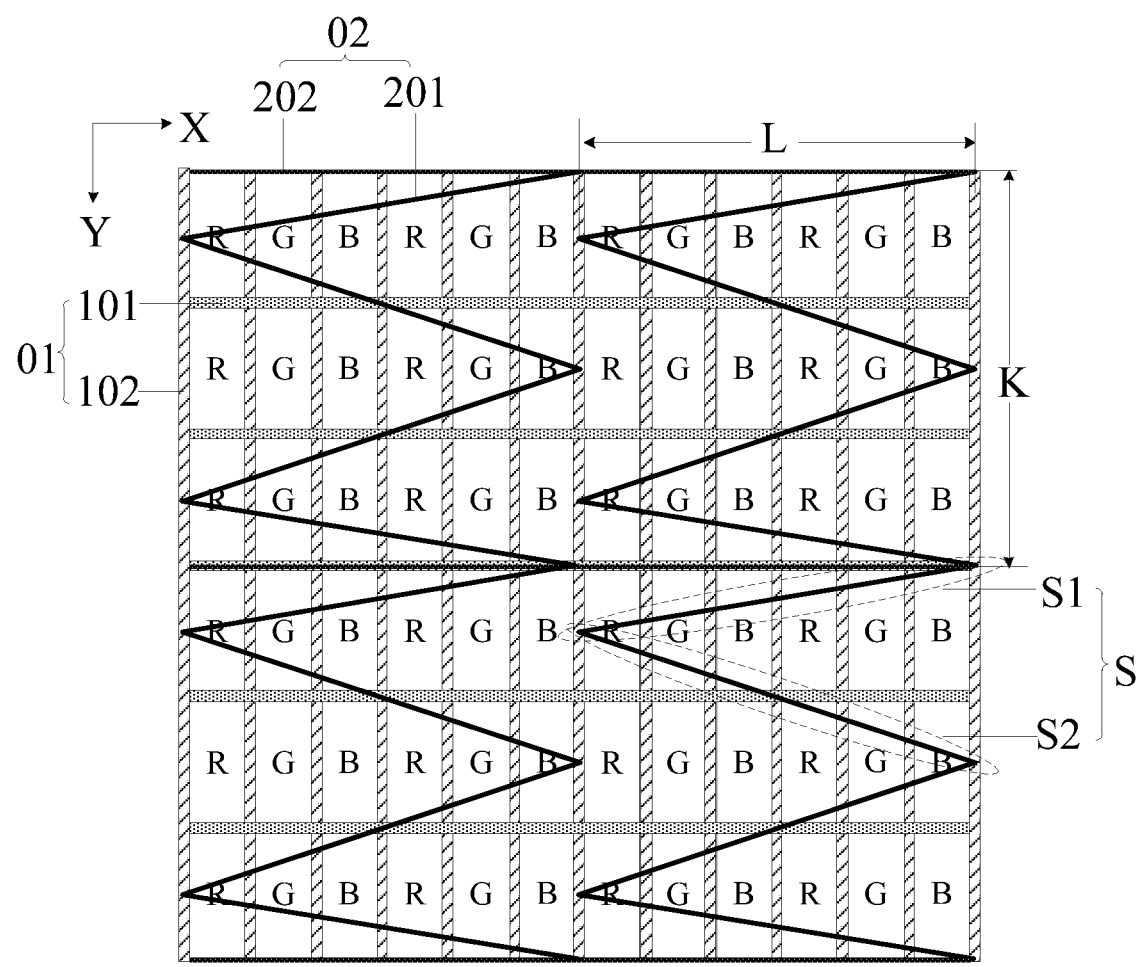
FIG. 9 is another schematic structural diagram of a liquid crystal display panel provided by an embodiment of the present disclosure.
Figure 10:
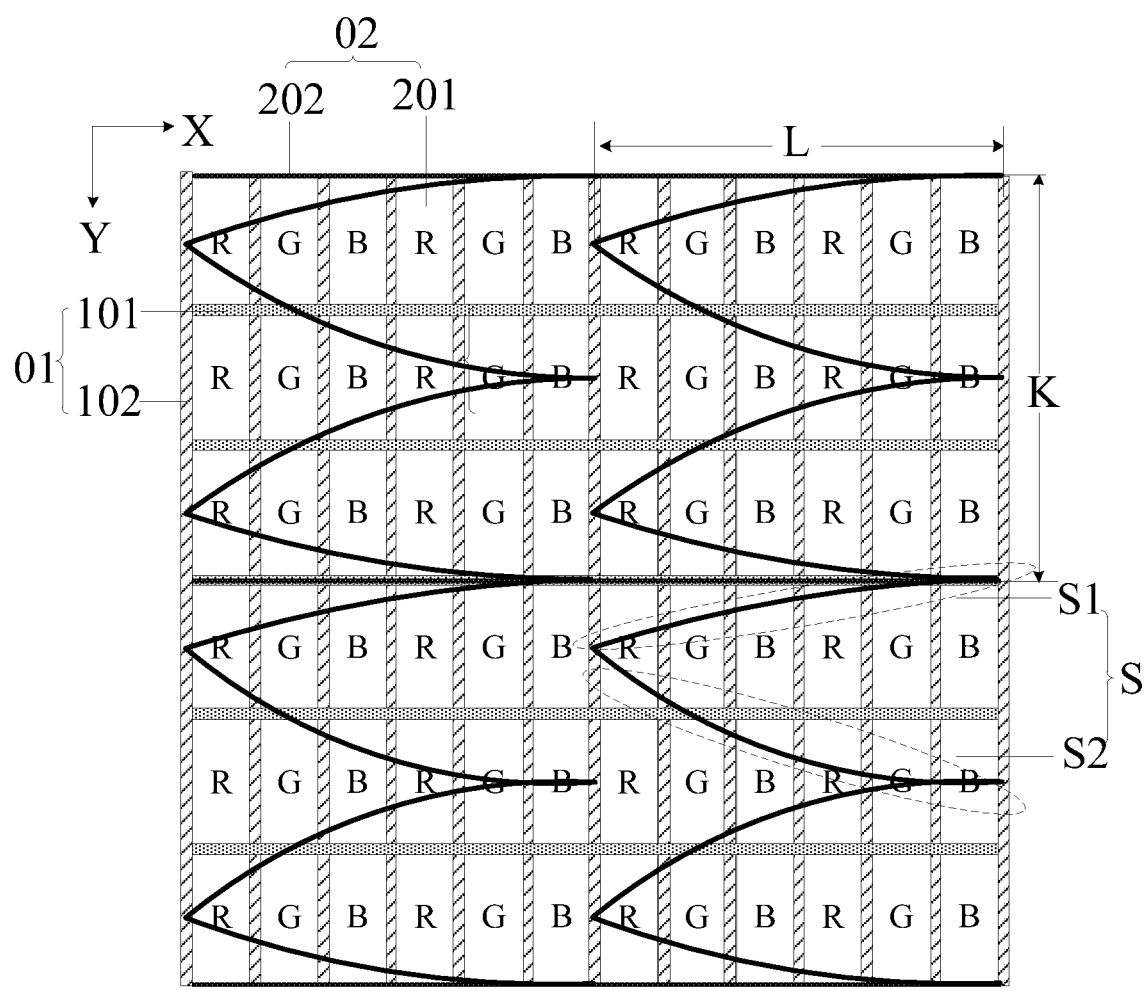
FIG. 10 is another schematic structural diagram of a liquid crystal display panel provided by an embodiment of the present disclosure.

Optionally, in the above liquid crystal display panel provided by the embodiment of the present disclosure, as shown in FIG. 4 to FIG. 10, m is an integer, n is a non-integer, and the broken line segments S are arranged continuously and periodically in the column direction. Optionally, the broken line segments S include: first line segments S1 and second line segments S2 of which extending directions intersect each other. Specifically, as shown in FIG. 3 to FIG. 8, the first line segments S1 and the second line segments S2 are symmetrical with respect to the row direction X; or, as shown in FIG. 9 and FIG. 10, widths of the first line segments S1 and the second line segments S2 in the column direction Y are unequal, and lengths of the first line segments S1 and the second line segments S2 in the row column X are equal or approximately equal. In other words, the first line segments S1 and the second line segments S2 may be symmetrical or asymmetrical with respect to the row direction. Preferably, as shown in FIG. 3 to FIG. 10, two adjacent broken line segments S in the column direction Y are symmetrical with respect to the row direction X.

Exemplarily, in FIG. 3 to FIG. 10, m is 6, and n is 1.5. Through simulation test, under the situation that a color mura level of the liquid crystal display panel shown in FIG. 1 is 5, a color mura level of the liquid crystal display panel shown in FIG. 3 is changed to 2, and the color mura is well improved. In addition, a simulation result shows that when the width K of the broken line segments S in the column direction Y is approximately equal to the length of the n (n is a non-integer) sub-pixel units, the color mura may be reduced to different degrees. The higher the color mura level in the present disclosure, the more obvious the color mura.

It is easy to understand that, since the length L of the broken line segments S in the row direction X is equal to the width of the m sub-pixel units, and m is an integer, orthographic projections of inflection points of the broken line segments S and the two ends of the broken line segments S on the liquid crystal display structure 01 are located at a column gap of columns formed by the sub-pixel units, and will not affect the pixel aperture ratio. Of course, m may also be a non-integer, which is not limited herein.

Figure 11:
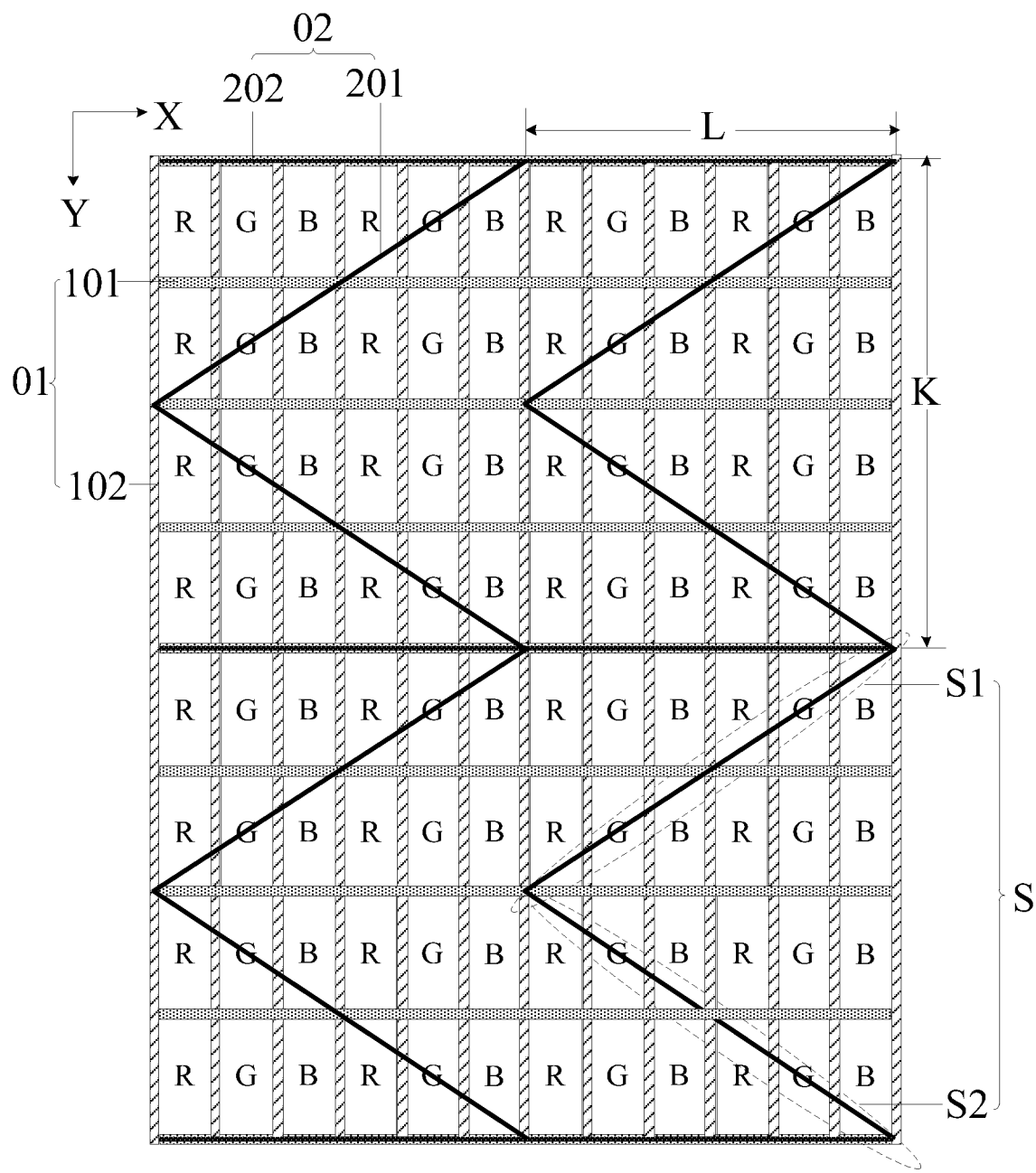
FIG. 11 is another schematic structural diagram of a liquid crystal display panel provided by an embodiment of the present disclosure.
Figure 12:
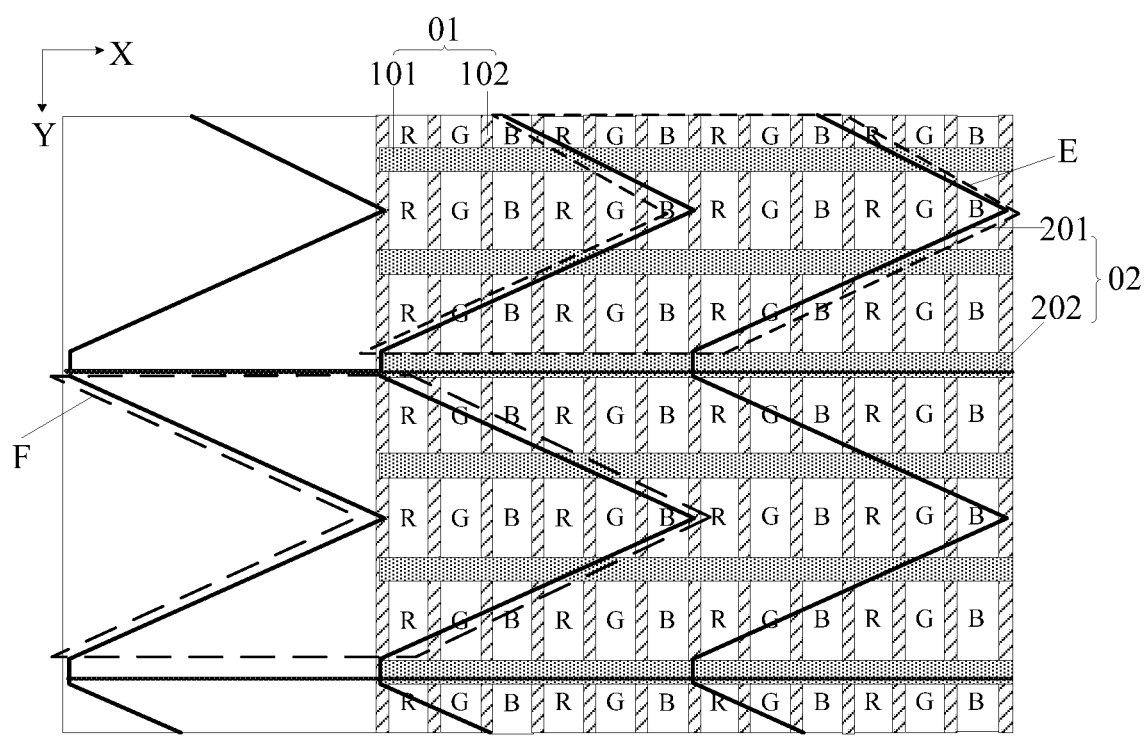
FIG. 12 is another schematic structural diagram of a liquid crystal display panel provided by an embodiment of the present disclosure.

In addition, it should be noted that, when m and n are both integers, the broken line segments S may be arranged continuously and periodically (as shown in FIG. 11), or the straight line segments Z may be disposed between the broken line segments S (as shown in FIG. 2). Specifically, in FIG. 11, m is 6 and n is 4. Through simulation test, under the situation that the color mura level of the liquid crystal display panel shown in FIG. 1 is 5, a color mura level of the liquid crystal display panel shown in FIG. 8 is changed to 3, and the color mura is well improved.

Figure 6:
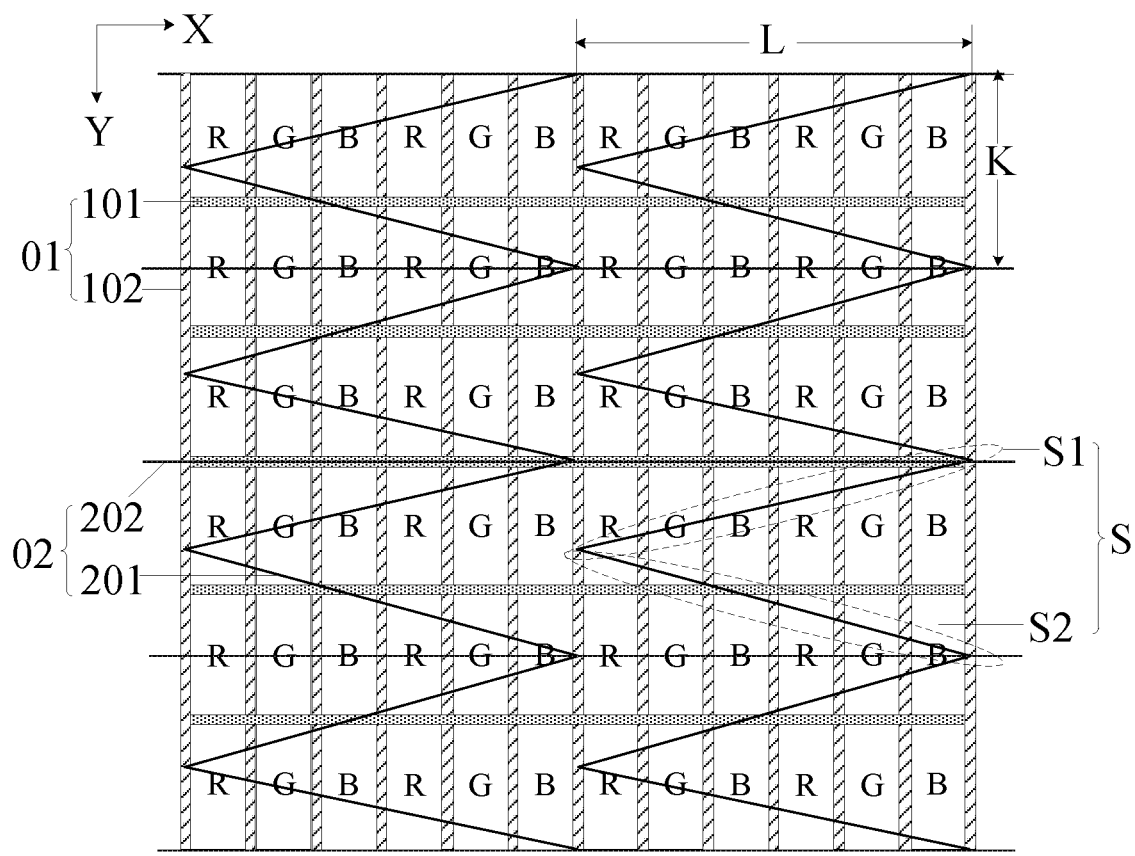
FIG. 6 is another schematic structural diagram of a liquid crystal display panel provided by an embodiment of the present disclosure.

Optionally, in the above liquid crystal display panel provided by the embodiment of the present disclosure, as shown in FIG. 2, FIG. 4 to FIG. 7, and FIG. 9, the first line segments S1 and the second line segments S2 may be straight lines, or as shown in FIG. 8 and FIG. 10, the first line segments S1 and the second line segments S2 may also be curves, which is not limited herein.

Optionally, in the above liquid crystal display panel provided by the embodiment of the present disclosure, the liquid crystal display panel has a display region and a peripheral region, and the liquid crystal light control structure 02 further includes: one or more first light control units E located in the display region and one or more second light control units F located in the peripheral region; in a direction perpendicular to the liquid crystal display structure 01, the quantity of the sub-pixel units covered by the one or more second light control units F is smaller than the quantity of the sub-pixel units covered by the one or more first light control units E, to ensure that effective regional dimming can be achieved for each column of sub-pixel units.

Figure 13:
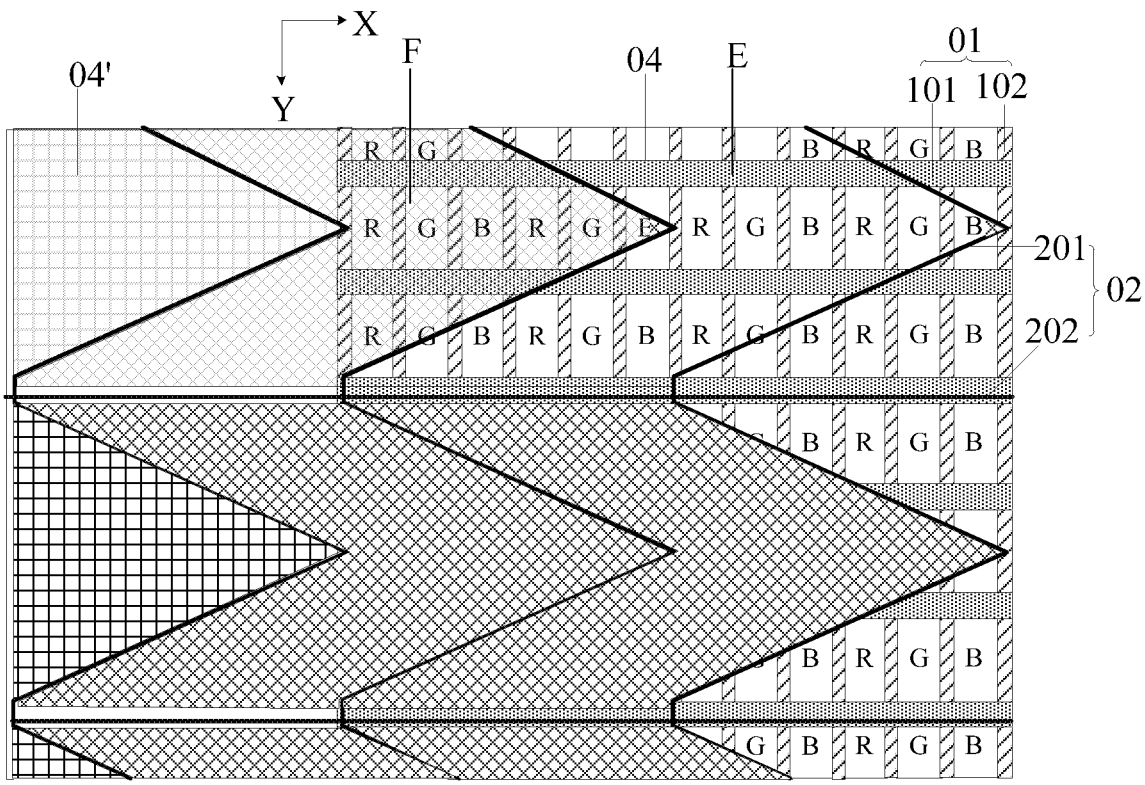
FIG. 13 is another schematic structural diagram of a liquid crystal display panel provided by an embodiment of the present disclosure.

Optionally, in the above liquid crystal display panel provided by the embodiment of the present disclosure, as shown in FIG. 13, the first light control unit E and the second light control unit F are each internally provided with a pixel electrode 04, and the liquid crystal light control structure 02 further includes: a plurality of floating electrodes 04' disposed in the same layer as the pixel electrodes 04; and the plurality of floating electrodes 04' are located on a side of a plurality of second light control units F away from the display region, and boundaries of the plurality of floating electrodes 04' away from the display region extend in the same straight line, so as to simplify the manufacturing process.

Figure 14:
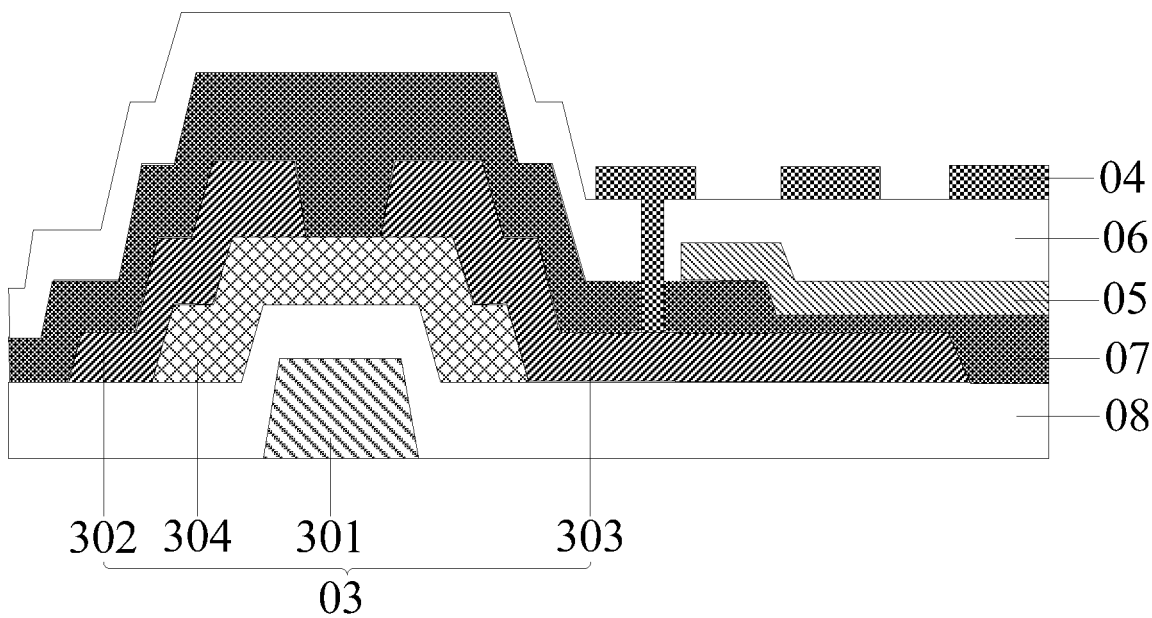
FIG. 14 is another schematic structural diagram of a liquid crystal display panel provided by an embodiment of the present disclosure.

Generally, as shown in FIG. 14, each switch transistor 03 generally includes a gate 301, a source 302, a drain 303 and an active layer 304, and according to different types of the switch transistors 03, functions of the source 302 and the drain 303 are interchangeable. In addition, the liquid crystal light control structure 02 may specifically further include: a common electrode 05 located between a layer where the source 302 and the drain 303 are located and the corresponding strip-shaped pixel electrode 04, a first insulating layer 06 located between the pixel electrode 04 and the common electrode 05, a second insulating layer 07 between the layer where the source 302 and the drain 303 are and the common electrode 05, and a gate insulating layer 08 between the active layer 304 and the gate 301.

Optionally, in the above liquid crystal display panel provided by the embodiment of the present disclosure, an orthographic projection of the common electrode 05 on a plane where the liquid crystal light control structure 02 is located completely covers the orthographic projections of the second data lines 201. Since an electric field action between the common electrode 05 and the pixel electrodes 04 promotes the deflection of the liquid crystal molecules to control a light-emitting direction and brightness, and under a situation that the common electrode 05 shields the second data lines 201, no light leakage will occur, so it is not necessary to provide a black matrix for shielding the second data lines 201.

Figure 5:
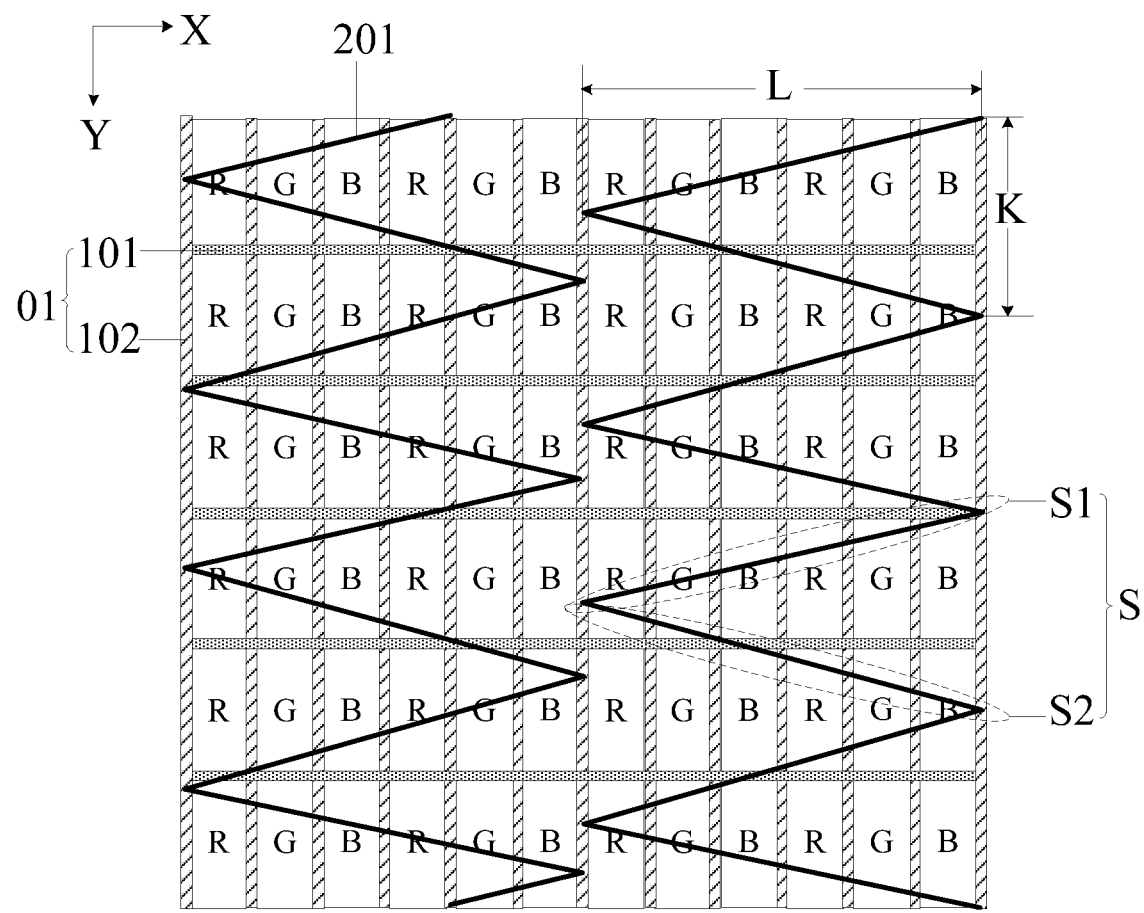
FIG. 5 is another schematic structural diagram of a liquid crystal display panel provided by an embodiment of the present disclosure.

Optionally, in the above liquid crystal display panel provided by the embodiment of the present disclosure, inflection points of any two adjacent second data lines 201 may be flush with each other in the row direction (as shown in FIG. 2, FIG. 4, and FIG. 6 to FIG. 13), or may be staggered from each other (as shown in FIG. 5).

Optionally, in the above liquid crystal display panel provided by the embodiment of the present disclosure, in order to avoid affecting the pixel aperture ratio, as shown in FIG. 2, and FIG. 4 to FIG. 13, orthographic projections of the inflection points of the plurality of second data lines 201 on the liquid crystal display structure 01 may be located within the orthographic projections of the plurality of first data lines 102. Of course, during specific implementation, the orthographic projections of the inflection points of the second data lines 201 on the liquid crystal display structure 01 may also be slightly deviated from the orthographic projections of the first data lines 102, for example, at the borderlines of the first data lines 102 and the sub-pixel units.

Optionally, in the above liquid crystal display panel provided by the embodiment of the present disclosure, as shown in FIG. 2, and FIG. 4 to FIG. 13, orthographic projections of the plurality of second gate lines 202 on the liquid crystal display structure 01 are located within orthographic projections of the plurality of first gate lines 101 or overlap the pixel rows formed by the plurality of sub-pixel units. Since there is no visual dislocation of the second gate lines 202 extending in the row direction X under the left and right viewing angles, the color mura will not be caused even if the second gate lines 202 overlap the pixel rows.

Figure 15:
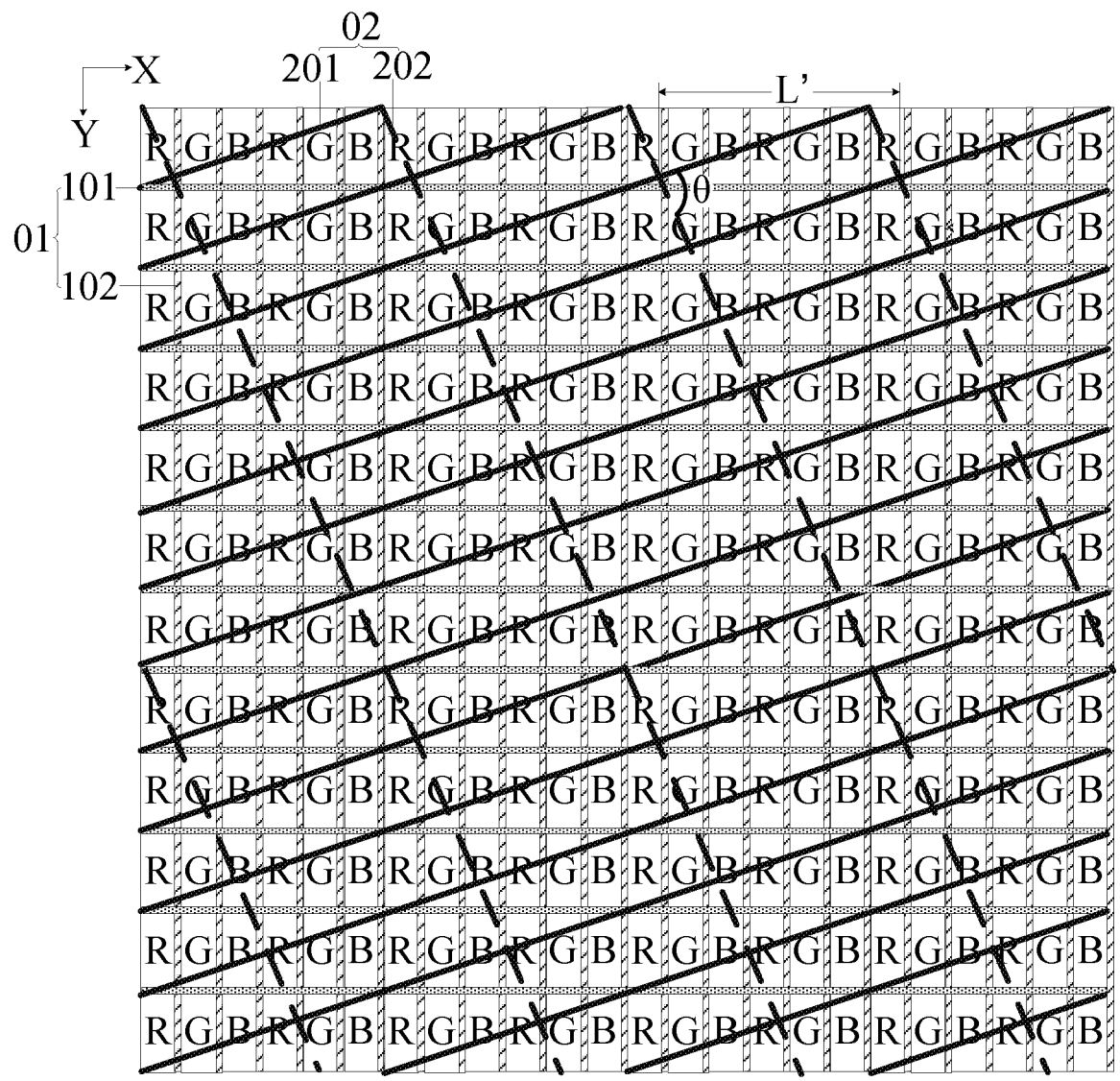
FIG. 15 is another schematic structural diagram of a liquid crystal display panel provided by an embodiment of the present disclosure.

Optionally, in the above liquid crystal display panel provided by the embodiment of the present disclosure, as shown in FIG. 15, the liquid crystal light control structure 02 further includes: the plurality of second gate lines 202 intersecting the plurality of second data lines 201; each of the second data lines 201 is a straight line extending in a first direction intersecting both the row direction X and the column direction Y; each of the second gate lines 202 is a straight line extending in a second direction intersecting both the row direction X and the column direction Y; and the plurality of second data lines 201 and the plurality of second gate lines 202 intersect each other to form a plurality of meshes.

As can be seen from FIG. 15, the plurality of second data lines 201 and the plurality of second gate lines 202 intersect each other to form the plurality of meshes, which is equivalent to the plurality of second data lines 201 and the plurality of second gate lines 202 intersect each other to form broken lines with a general direction is the column direction Y, so that the broken lines viewed under different left and right oblique viewing angles uniformly shields each sub-pixel unit, so that the actual aperture ratio of each sub-pixel unit is similar, the mixed white light effect can be produced, and the color mura is effectively improved.

Optionally, in the above liquid crystal display panel provided by the embodiment of the present disclosure, as shown in FIG. 15, a projection length L' of the meshes in the row direction X is approximately equal to the length of the six sub-pixel units; and in the column direction Y, an included angle θ between the second data lines 201 and the second gate lines 202 ranges from 75° to 135°, for example, 75°, 80°, 85°, 90°, 95°, 100°, 105°, 110°, 115°, 120°, 125°, 130°, 135°, etc. Through simulation test, under the situation that the color mura level of the liquid crystal display panel shown in FIG. 1 is 5, the design can change the color mura level to 3, and the color mura is effectively improved.

Optionally, in the above liquid crystal display panel provided by the embodiment of the present disclosure, as shown in FIG. 6, a line width of the second data lines 201 ranges from 0.5 μm to 3 μm, for example, 0.5 μm, 1 μm, 1.5 μm, 2 μm, 2.5 μm, 3 μm, etc.

Generally, the line width of the second data lines 201 ranges from 3 μm to 5 μm. Compared with the related art, the line width of the second data lines 201 in FIG. 6 is reduced. By making the second data lines 201 narrower, the shielding of each sub-pixel unit by the second data lines 201 becomes less, the aperture ratio of each sub-pixel unit is increased, the brightness of the mixed white light is increased, and the visually observed color mura is further weakened. Specifically, the second data lines 201 with the line width of 0.5 μm-3 μm may be prepared by using materials such as graphene and carbon nanotubes. Through simulation test, under the situation that the color mura level of the liquid crystal display panel shown in FIG. 1 is 5, the design can change the color mura level to 1, and the color mura is significantly improved.

Optionally, in the above liquid crystal display panel provided by the embodiment of the present disclosure, as shown in FIG. 7, the second data lines 201 are transparent traces.

In the related art, metal or alloys such as copper are used to make the second data lines 201. The second data lines 201 in FIG. 7 are made of transparent materials such as ITO, IZO, etc., so that the shielding effect of the second data lines 201 on each sub-pixel unit can be ignored, and the backlight is irradiated to each sub-pixel unit on the liquid crystal display structure 01 through the second data lines 201 to achieve a more obvious mixed white light effect, and the color mura phenomenon is further improved. Through simulation test, under the situation that the color mura level of the liquid crystal display panel shown in FIG. 1 is 5, the design can change the color mura level to 1, and the color mura is significantly improved.

Optionally, in the above liquid crystal display panel provided by the embodiment of the present disclosure, in order to better improve the color mura, a light transmittance of the second data lines 201 may ranges from 0.8 to 0.98, for example, 0.8, 0.85, 0.9, 0.95, 0.98, etc.

Optionally, in the above liquid crystal display panel provided by the embodiment of the present disclosure, as shown in FIG. 7, the line width of the second data lines 201 ranges from 0.5 μm to 12 μm or 0.5 μm to 13 μm, for example, 0.5 μm, 1 μm, 2 μm, 3 μm, 4 μm, 5 μm, 6 μm, 7 μm, 8 μm, 9 μm, 10 μm, 11 μm, 12 μm, 13 μm, etc.

Under the situation that the second data lines 201 are the transparent traces, appropriately increasing the width of the second data lines 201 will not make the shielding effect of the second data lines 201 on each sub-pixel unit stronger. Therefore, the wider and transparent second data lines 201 may also improve the color mura.

Specifically, the above color mura simulation results are obtained on the conditions that a size (pixel pitch) of the pixel units (including red sub-pixels R, green sub-pixels G and blue sub-pixels B) in the liquid crystal display structure is 161.1 μm, a vertical distance between the human eyes and the display surface of the liquid crystal display structure 01 is 300 mm, the oblique viewing angle is 45°, a gap (gap) between the liquid crystal display structure 01 and the liquid crystal light control structure 02 is 500 μm, and an overall refractive index of the liquid crystal light control structure 02 is 1.5.

Figure 16:
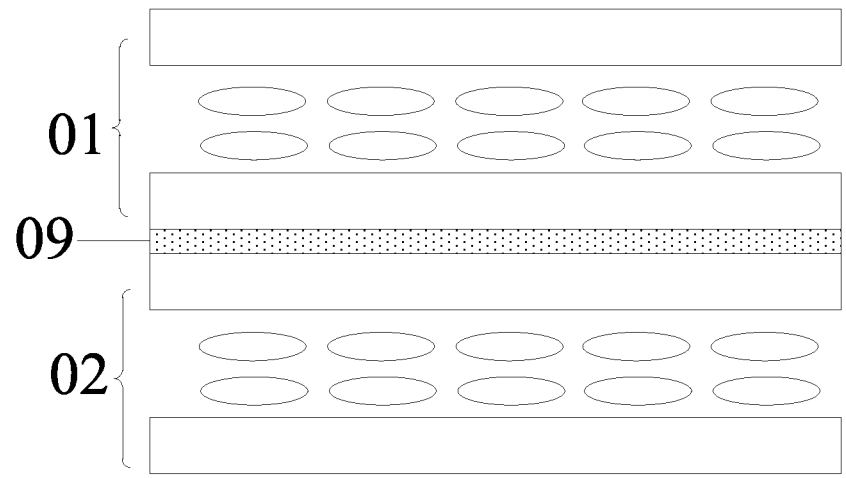
FIG. 16 is another schematic structural diagram of a liquid crystal display panel provided by an embodiment of the present disclosure.
Figure 17:
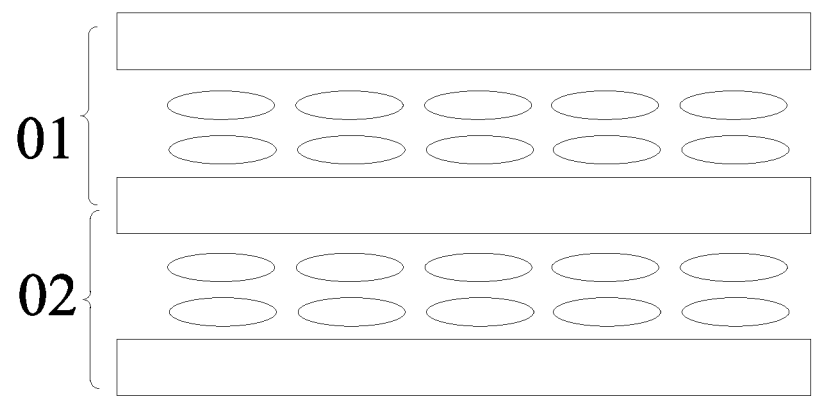
FIG. 17 is another schematic structural diagram of a liquid crystal display panel provided by an embodiment of the present disclosure.

Optionally, in the above liquid crystal display panel provided by the embodiment of the present disclosure, as shown in FIG. 16, the liquid crystal display structure 01 and the liquid crystal light control structure 02 are bonded by transparent optical glue 09, so that the manufacturing process is relatively simple and easy to maintain. Or, as shown in FIG. 17, the liquid crystal display structure 01 and the liquid crystal light control structure 02 may share the same substrate on the adjacent sides, so that the thickness of the display panel is advantageously reduced and the manufacturing cost is reduced.

In another aspect, an embodiment of the present disclosure provides a liquid crystal display device, including the above liquid crystal display panel provided by the embodiment of the present disclosure and a backlight source. The backlight source is a direct type backlight source or an edge type backlight source. The backlight source is located on a side of a liquid crystal light control structure away from a liquid crystal display structure, so that the backlight from the backlight source first enters the liquid crystal light control structure, and after an exit angle or intensity of the backlight is adjusted by the liquid crystal light control structure as required, the backlight enters the liquid crystal display panel, for example, the requirement of conversion between a narrow viewing angle and a wide viewing angle, and the requirement of controlling different luminous intensities of each position of the liquid crystal display panel, etc are met. The display device may be applied to any product or component with a display function, such as a mobile phone, a tablet computer, a TV, a monitor, a notebook computer, a digital photo frame, and a navigator. Since the principle of solving the problem of the display device is similar to that of the above liquid crystal display panel, the implementation of the display device may refer to the implementation of the above liquid crystal display panel, and the repetition will not be repeated.

According to the above liquid crystal display panel and the above liquid crystal display device provided by the embodiments of the present disclosure, the liquid crystal display panel includes: the liquid crystal display structure, the liquid crystal display structure including: the plurality of first gate lines extending in the row direction, the plurality of first data lines extending in the column direction, and the plurality of sub-pixel units defined by the plurality of first gate lines and the plurality of first data lines; and the liquid crystal light control structure located on the light incident side of the liquid crystal display structure, the liquid crystal light control structure including: the plurality of second data lines, and the orthographic projection of at least one second data line on the liquid crystal display structure overlapping the plurality of sub-pixel units, so as to improve the color mura phenomenon under the left and right oblique viewing angles.

It will be apparent to those skilled in the art that various modifications and variations can be made in the embodiments of the present disclosure without departing from the spirit or scope of the embodiments of the present disclosure. Thus, if these modifications and variations of the embodiments of the present disclosure fall within the scope of the claims of the present disclosure and its equivalent technology, the present disclosure is also intended to include these modifications and variations.

What is claimed is:

1. A liquid crystal display panel, comprising:
   a liquid crystal display structure, comprising: a plurality of first gate lines extending in a row direction, a plurality of first data lines extending in a column direction, and a plurality of sub-pixel units defined by the plurality of first gate lines and the plurality of first data lines; and
   a liquid crystal light control structure, located on a light incident side of the liquid crystal display structure, the liquid crystal light control structure comprising: a plurality of second data lines, and an orthographic projection of at least one second data line on the liquid crystal display structure overlapping the plurality of sub-pixel units.

2. The liquid crystal display panel according to claim 1, wherein overlapping areas of orthographic projections of the plurality of second data lines on the liquid crystal display structure and each of the plurality of sub-pixel unit are the same.

3. The liquid crystal display panel according to claim 1, wherein the liquid crystal light control structure further comprises: a plurality of second gate lines intersecting the plurality of second data lines;
   the second gate lines are straight lines extending in the row direction; and
   the second data lines are broken lines, and a general direction of the broken lines is the column direction.

4. The liquid crystal display panel according to claim 3, wherein the second data lines comprise: a plurality of broken line segments arranged periodically in the column direction; and
   a length of the broken line segments in the row direction is equal to or approximately equal to a width of m sub-pixel units, and a width of the broken line segments in the column direction is equal to or approximately equal to a length of n sub-pixel units, wherein m and n are greater than 0, and at least one of m or n is an integer.

5. The liquid crystal display panel according to claim 4, wherein n is an integer, and each second data line further comprises: a straight line segment connecting two adjacent broken line segments.

6. The liquid crystal display panel according to claim 5, wherein a length of the straight line segment is larger than a width of a second gate line and smaller than a row gap of pixel rows formed by the plurality of sub-pixel units.

7. The liquid crystal display panel according to claim 6, wherein the liquid crystal light control structure further comprises:
   a plurality of switch transistors, wherein orthographic projections of the plurality of switch transistors on the liquid crystal display structure are located in the row gap; wherein, part of the second gate lines are gates of the switch transistors, and part of the straight line segments are one of sources or drains of the switch transistors.

8. The liquid crystal display panel according to claim 7, wherein m is 6, and n is 3 or 4.

9. The liquid crystal display panel according to claim 4, wherein m is an integer, n is a non-integer, and the broken line segments are arranged continuously and periodically in the column direction.

10. The liquid crystal display panel according to claim 9, wherein m is 6 and n is 1.5.

11. The liquid crystal display panel according to claim 4, wherein the broken line segments comprise: first line segments and second line segments of which extending directions intersect each other.

12. The liquid crystal display panel according to claim 9, wherein first line segments and second line segments are symmetrical with respect to the row direction, or widths of first line segments and second line segments in the column direction are unequal, and lengths of the first line segments and the second line segments in the row column are equal or approximately equal.

13. The liquid crystal display panel according to claim 10, wherein two adjacent broken line segments in the column direction are symmetrical with respect to the row direction.

14. The liquid crystal display panel according to claim 1, wherein the liquid crystal display panel comprises a display region and a peripheral region, and the liquid crystal light control structure further comprises: a first light control unit located in the display region and a second light control unit located in the peripheral region; in a direction perpendicular to the liquid crystal display structure, a quantity of sub-pixel units covered by the second light control unit is smaller than a quantity of sub-pixel units covered by the first light control unit.

15. The liquid crystal display panel according to claim 14, wherein the first light control unit and the second light control unit are each internally provided with a pixel electrode, and the liquid crystal light control structure further comprises: a plurality of floating electrodes disposed in the same layer as the pixel electrodes; and
   the plurality of floating electrodes are located on a side of a plurality of second light control units away from the display region, and boundaries of the plurality of floating electrodes away from the display region extend in the same straight line.

16. The liquid crystal display panel according to claim 15, wherein the liquid crystal light control structure further comprises: a common electrode located between a layer where the switch transistors are located and a layer where the pixel electrodes are located; and
   an orthographic projection of the common electrode on a plane where the liquid crystal light control structure is located completely covers orthographic projections of the second data lines.

17. The liquid crystal display panel according to claim 16, wherein inflection points of any two adjacent second data lines are flush with each other or staggered from each other in the row direction.

18. The liquid crystal display panel according to claim 17, wherein orthographic projections of the inflection points of the plurality of second data lines on the liquid crystal display structure are located within orthographic projections of the plurality of first data lines;
wherein orthographic projections of the plurality of second gate lines on the liquid crystal display structure are located within orthographic projections of the plurality of first gate lines or overlap pixel rows formed by the plurality of sub-pixel units.

19. The liquid crystal display panel according to claim 1, wherein the liquid crystal light control structure further comprises: a plurality of second gate lines intersecting the plurality of second data lines;
each of the second data lines is a straight line extending in a first direction intersecting both the row direction and the column direction;
each of the second gate lines is a straight line extending in a second direction intersecting both the row direction and the column direction; and
the plurality of second data lines and the plurality of second gate lines intersect each other to form a plurality of meshes.

20. A liquid crystal display device, comprising a liquid crystal display panel and a backlight source, wherein the liquid crystal display panel comprises:
a liquid crystal display structure, comprising: a plurality of first gate lines extending in a row direction, a plurality of first data lines extending in a column direction, and a plurality of sub-pixel units defined by the plurality of first gate lines and the plurality of first data lines; and
a liquid crystal light control structure, located on a light incident side of the liquid crystal display structure, the liquid crystal light control structure comprising: a plurality of second data lines, and an orthographic projection of at least one second data line on the liquid crystal display structure overlapping the plurality of sub-pixel units.

* * * * *